(12) United States Patent
Hulten

(10) Patent No.: US 7,322,448 B2
(45) Date of Patent: Jan. 29, 2008

(54) BRAKE COMPONENT, DISC BRAKE, DRUM BRAKE, AND METHOD FOR MANUFACTURING A BRAKE COMPONENT

(75) Inventor: Johan Hulten, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/306,376

(22) Filed: Dec. 26, 2005

(65) Prior Publication Data

US 2006/0196738 A1    Sep. 7, 2006

Related U.S. Application Data

(63) Continuation of application No. 10/248,290, filed on Jan. 6, 2003, now abandoned, which is a continuation of application No. PCT/SE01/01395, filed on Jun. 20, 2001.

(30) Foreign Application Priority Data

Jul. 6, 2000    (SE) .................................... 0002565

(51) Int. Cl.
*F16D 65/04*    (2006.01)
(52) U.S. Cl. ................................ 188/250 B; 188/250 E
(58) Field of Classification Search ............ 188/250 B, 188/250 E
See application file for complete search history.

(56) References Cited

U.S. PATENT DOCUMENTS

| | | | | |
|---|---|---|---|---|
| 4,552,252 A | * | 11/1985 | Stahl | 188/73.1 |
| 4,691,810 A | * | 9/1987 | Matsuzaki | 188/73.1 |
| 5,332,067 A | * | 7/1994 | Prud'homme | 188/73.1 |
| 5,836,428 A | * | 11/1998 | Young | 188/250 G |
| 5,842,546 A | * | 12/1998 | Biswas | 188/73.37 |
| 6,105,735 A | * | 8/2000 | Lin et al. | 188/73.1 |
| 6,851,527 B2 | * | 2/2005 | Hoffrichter et al. | 188/251 A |

* cited by examiner

*Primary Examiner*—Pam Rodriguez
(74) *Attorney, Agent, or Firm*—Novak Druce & Quigg, LLP

(57) ABSTRACT

Brake member where the occurrence of brake squeal when a fluctuating load is applied onto the brake member is reduced by way of a brake member or arrangement that includes a backing plate carrying a brake lining which exhibits at least one contact surface and side surfaces surrounding that contact surface and in which the side surfaces are connected to the contact surface and to the backing plate. The contact surface is adapted to exhibit an edge area surrounding the contact surface and in which at least a portion of the edge area exhibits a local deformation stiffness in a direction vertical to a plane through the contact surface which differs, at most, fifteen percent from the deformation stiffness in a central area in the interior of the contact surface. Utilization of this brake member is equally applicable in disc- and drum-style brake arrangements that can suffer from the occurrence of brake squeal when applying a fluctuating load onto the brake member.

19 Claims, 3 Drawing Sheets

BRAKE COMPONENT, DISC BRAKE, DRUM BRAKE, AND METHOD FOR MANUFACTURING A BRAKE COMPONENT

CROSS REFERENCE TO RELATED APPLICATIONS

The present application is a continuation of U.S. application Ser. No. 10/248,290 filed Jan. 6, 2003 now abandoned which is a continuation of International Application No. PCT/SE01/01395 filed 20 Jun. 2001. International Application No. PCT/SE01/01395 is published in English pursuant to PCT Article 21(2) and claims priority to Swedish Application No. 0002565-0 filed 6 Jul. 2000. Each of said applications are hereby expressly incorporated herein by reference in their entireties.

TECHNICAL FIELD

The present invention relates to a brake member or arrangement that includes a backing plate carrying a brake lining which exhibits at least one contact surface and side surfaces surrounding that contact surface and in which the side surfaces are connected to the contact surface and to the backing plate. More particularly, the invention relates to a brake member where the occurrence of brake squeal can be reduced by means of the design of a brake lining, particularly by design of the side surfaces of the brake lining.

TECHNICAL BACKGROUND

When engaging the brakes of a vehicle, sometimes so called brake squeal is created. This effect is something that occurs both where disc and drum brakes are concerned. Typical frequencies of this noise are around a few kHz and within the sensitivity range of human hearing. The squeal noise that is produced decreases as the distance increases from the sound source, but can still be approximately 140 dB when close to the braking device. Most people will appreciate that city buses which stop at frequent intervals within densely populated areas, can be particularly disturbing. One frequent reason for complaint on new private cars, lorries and buses is brake squeal, including in association with ABS-braking systems. Even if brake squeal does not influence the braking power, and in turn safety, the problem is still of great importance because it is annoying to the customer, and therefore merits solution.

The problem of brake squeal has been analyzed many times, and many different solutions have been tested. For example, it has been tried to dimension the components included in brake systems in order to obtain a changed natural frequency of the system, but these attempts have not been able to reduce the occurrence of brake squeal in braking systems.

For example, U.S. Pat. No. 5,145,037 discloses a disc brake where the occurrence of brake squeal is intended to be reduced by means of beveling end regions of the brake disc within a region, the extension of which is dependent on the width between claws included in a brake yoke carrying a backing plate where the brake lining is arranged.

Furthermore, from GB 2143919 a disc brake is known where brake squeal is intended to be reduced by means of designing a backing plate included in the disc brake with an inclination in relation to the brake disc included in the disc brake.

Even if the above-mentioned suggestions, in certain predetermined conditions, are instrumental in reducing the occurrence of brake squeal, these solutions do not reduce the occurrence of brake squeal when applying a fluctuating load onto the brake member.

SUMMARY OF THE INVENTION

An object of the present invention is to provide a brake member where the occurrence of brake squeal when a fluctuating load being applied onto the brake member is reduced. This object is achieved by means of a brake member or arrangement that includes a backing plate carrying a brake lining which exhibits at least one contact surface and side surfaces surrounding that contact surface and in which the side surfaces are connected to the contact surface and to the backing plate. The contact surface is adapted so that it exhibits an edge area surrounding the contact surface and in which at least a portion of the edge area exhibits a local deformation stiffness in a direction vertical to a plane through the contact surface which differs, at most, fifteen percent from the deformation stiffness in a central area in the interior of the contact surface.

Further objects of the invention are to provide this effect in different types of brake members including disc- and drum-style brakes that can suffer from the occurrence of brake squeal when applying a fluctuating load onto the brake member.

Still another object of the invention is to provide a method for manufacturing brake members where the occurrence of brake squeal when applying a fluctuating load onto the brake member is reduced.

In at least one embodiment, the present invention takes the form of a squeal retarding brake assembly that includes a backing plate upon which a brake lining is carried. The brake lining has a contact surface and surrounding side surfaces that are angularly disposed between the contact surface and the backing plate. The brake lining includes a brake-squeal retardation means for preventing squeal noise when the brake assembly is actuated to slow an incorporating vehicle and for assuring that, at the contact surface, the local stiffness against deformation is substantially uniform thereacross during periods of brake actuation. This prevents the institution of squeal noise inducing vibrations in the brake assembly, a purpose at which the invention is directed.

The invention may also be described as a brake member that includes a backing plate upon which the brake lining is carried. The brake lining has at least one contact surface and side surfaces surrounding the contact surface and which are connected between the contact surface and the backing plate. The contact surface includes a surrounding edge area, at least a portion of which exhibits a local deformation stiffness in a direction vertical to a plane through the contact surface which at most differs fifteen percent from the deformation stiffness in a central area of an interior portion of the contact surface.

BRIEF DESCRIPTION OF THE DRAWINGS

In the following, the invention will be described in greater detail with reference to the attached drawings, in which.

DETAILED DESCRIPTION

As mentioned hereinabove, the phenomenon of brake squeal has been well studied; an example of this is found in the article entitled "An assumed Modes Method Approach to Disc Brake Squeal Analysis" in the Society of Automotive Engineers, 1999-01-1335 by Hulten and Flint. Therein, it is explained that, as a result of the rotational symmetry of a brake member such as a brake disc, there are two modes at each natural frequency of the brake member. When a pair of modes exists for a natural frequency, a wave can propagate through the brake member if excitation energy is supplied, wherein noise, so-called brake squeal, may arise. When a brake lining connects brake disc, alternatively brake drum, and brake lining, the connected modes are divided into separate natural frequencies of the system. Non-conservative forces, such as for example frictional forces, tend to connect these separate modes and join them into a common natural frequency in which brake squeal may arise. Accordingly, in order to prevent the creation of brake squeal, the system has to be designed such that a separation of a set of modes that primarily exhibit natural frequencies between 1 and 15 kHz can be maintained. The connection, and thereby the occurrence of brake squeal, can occur for a number of different natural frequencies and is dependent on the interaction between brake lining and brake member, including either disc or drum configurations. In order to enable the design of a brake member where the risk of occurrence of brake squeal is reduced for most natural frequencies, preferably all natural frequencies within the above-mentioned interval, it is of importance that the interaction between brake lining and disc or drum takes place in a predictable way.

Figure 1:
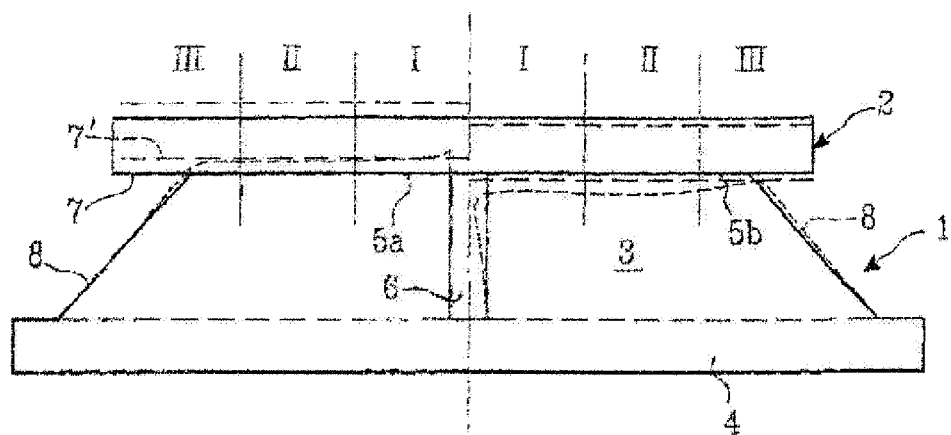
FIG. 1 demonstrates exemplary deformation of a known brake lining when subjected to an equilibrium load, a larger and a smaller load.

Furthermore, in connection with the invention, studies concerning the contact of the brake lining with the brake disc or brake drum have been performed. FIG. 1 shows a symbolic representation of a known brake member 1 which interacts with a brake disc 2. The brake member includes a brake lining 3 and a backing plate 4. The brake lining 3 exhibits a first and a second contact surface 5a, 5b, which are intended to press against the brake disc 2 or, whenever applicable, against a brake drum. Furthermore, the brake lining 3 exhibits a groove 6 that delimits the contact surface 5a from the contact surface 5b.

Figure 2:
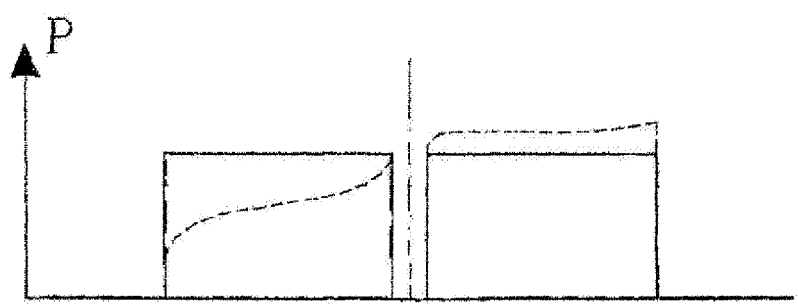
FIG. 2 illustrates the pressure distribution of a known brake lining when subjected to an equilibrium load, a larger and a smaller load.

During the working life of the brake lining 3, it will be worn down so that the brake lining forms a flat surface when a certain force is applied onto the brake lining by, for example, braking cylinders. The initial condition (an equilibrium condition) is shown in FIG. 1 with a continuous line. FIG. 2 schematically illustrates the pressure distribution across the contact surfaces during the run-in condition where the contact surface or surfaces of the brake lining are flat as is shown by the continuous line.

The left part of FIG. 1 shows deformation of the brake lining 3, with dashed lines, when it is pressed against a brake disc 2 or, whenever applicable, a brake drum with a force which is smaller than the particular force resulting in the above-mentioned flat equilibrium condition. In this case, the contact surface of the brake disc is displaced from the initial position 7 into a second position 7'. Furthermore, in exaggerated magnification, it is shown how the surface of the brake lining is deformed into a shape that has been indicated with dashed lines when subjected to a smaller load. Since the local deformation stiffness of the brake lining varies across the surface, different contact forces are created across the surface of the brake lining by a force that differs from the particular force that creates the equilibrium condition. Here, local deformation stiffness means the spring constant in a locally delimited area in the direction of the normal to the contact surface. Studies have shown that the spring constant of a homogenous material is lower at an edge region having vertical side surfaces than in regions having inclined side surfaces or in an inner region at a distance from the edge of the homogenous material. This means that the spring constant at the groove 6 located in the brake lining 3 exhibits a lower deformation stiffness than in an inner region of the brake lining. Furthermore, the brake lining 3 exhibits a higher deformation stiffness at the beveled flanks 8 than in the inner region of the brake lining. This results in the brake lining bulging outwards at the region (I) located closest to said groove 6, and bulging inwards at the region (III) located closest to the beveled edge 8, when subjected to the smaller load.

The left part of FIG. 2 shows the pressure distribution across the brake lining 3, with dashed lines, when the brake lining is loaded with a smaller load than the abovementioned certain equilibrium force. From the explanation above, it is evident that the pressure within the region (I) is higher than within the region III when a smaller load than the equilibrium load is applied onto the brake lining. The pressure distribution at the abovementioned certain force is shown with continuous lines.

The right part of FIG. 1 shows deformation of the brake lining 3, with dashed lines, when the brake lining is pressed against the brake disc 2 or, whenever applicable, a brake drum, with a force exceeding the above-mentioned certain force resulting in the flat equilibrium condition. In this case, the contact surface of the brake disc is displaced from the initial position 7 into a third position. Furthermore, in exaggerated magnification, it can be seen how the surface of the brake lining is deformed into a shape that is indicated with dashed lines when subjected to a larger load. Since the local deformation stiffness of the brake lining varies across the surface, different contact forces are created across the surface of the brake lining as a result of a force that differs from the above-mentioned certain force resulting in said equilibrium condition. Also in this case, the spring constant at the groove 6 located in the brake lining 3 exhibits a lower deformation stiffness that in an inner region of the brake lining, and the brake lining 3 exhibits a higher deformation stiffness at the beveled flanks 8, 9 than in the inner region of the brake lining. This results in the brake lining bulging inwards at the region (I) located closest to the groove 6, and bulging outwards at the region (III) located closest to the beveled edge 8, when subjected to the larger load.

The right part of FIG. 2 shows the pressure distribution across the brake lining 3, with dashed lines, when the brake lining is loaded with a larger load than the abovementioned certain force. From the explanation above, it is evident that the pressure within the region (I) is lower than within the region (III) when a larger load than the equilibrium load is applied onto the brake lining. The pressure distribution with the above-mentioned certain force is shown with continuous lines.

As a result of these shape and pressure changes that occur when applying different pressure forces to the brake lining, it is made considerably more difficult to design brake linings where the risk of connecting a plurality of separated modes can be reduced.

Accordingly, an object of the present invention is achieved by means of providing a brake system where a brake lining exhibits a contact surface having an edge area surrounding the contact surface wherein at least a portion of the edge area exhibits a local deformation stiffness in a direction vertical to a plane through the contact surface which differs fifteen percent (15%) at most from the deformation stiffness in a central area in the interior of the contact surface. By means of this design, a substantially more constant pressure is created across the brake lining when subjected to different loads.

Figure 3:
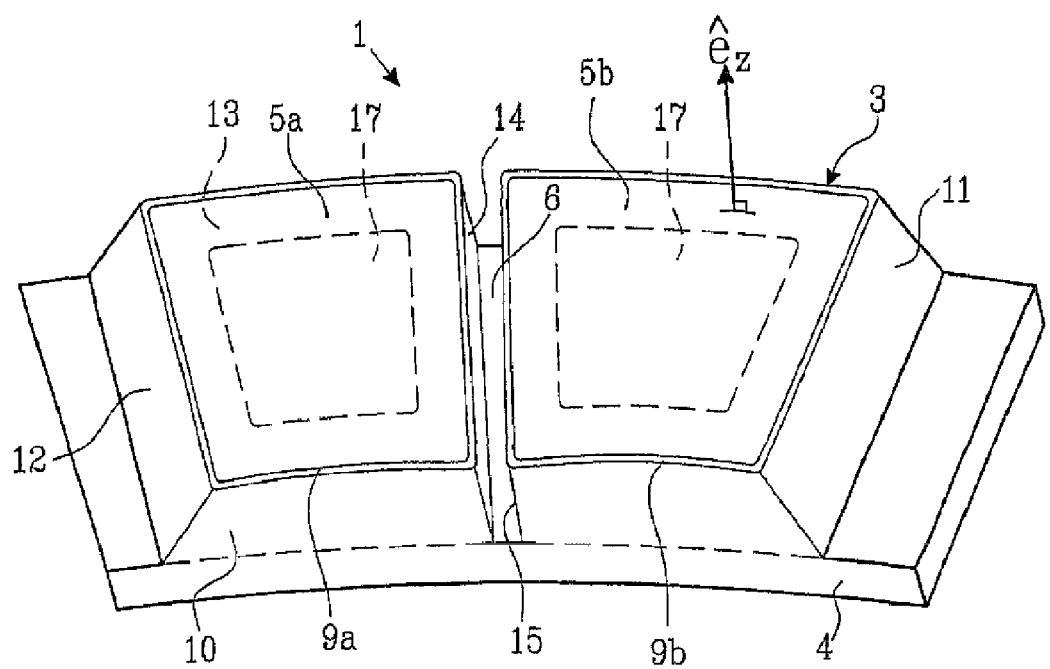
FIG. 3 is a perspective view of a brake lining configured according to the present invention.

FIG. 3 shows a perspective view of a brake member 1 according to the invention. The brake member is arranged in a general way for interacting with a brake disc or a brake drum. Examples of such interaction and included elements necessary in order to provide a functioning braking device are well known. Exemplary arrangements are found in U.S. Pat. No. 5,145,037 and GB 2 143 916, each of which are expressly incorporated by reference for purposes of disclosure of such arrangements, and which constitute an example of a disc brake where brake members according to the invention can be utilized. SE 504 272 provides an example of a drum brake where brake members according to the invention can be utilized.

The brake member 1 includes a brake lining 3 and a backing plate 4. Preferably, the brake lining 3 and backing plate 4 are designed in one piece. Alternatively, the brake lining 3 can be attached to the backing plate 4 in any way known to the skilled person. The brake lining 3 constitutes a wear surface when the brake member is used for braking, and the backing plate distributes the pressure force from braking cylinders (not shown) to the brake lining when the brake member is utilized in a brake device. One example of the design of a brake device having braking cylinders can be found in U.S. Pat. No. 5,145,037.

In a preferred embodiment, the brake lining exhibits a first and a second contact surface 5a, 5b which are intended to be pressed against a brake disc or, whenever applicable, against a brake drum. It should be appreciated that such a disc or drum is not shown in FIG. 3, but would be positioned above the lining 3 for pressed engagement therewith. Furthermore, the brake lining 3 in this embodiment exhibits a groove 6 that delimits the contact surface 5a from the contact surface 5b. The invention also can be utilized with brake linings having a single wear surface, but is particularly advantageous with brake linings having several wear surfaces separated by grooves, since the edge/area-ratio of the contact surfaces of such brake members is usually larger. Furthermore, the contact surfaces 5a and 5b exhibit an edge area 9 including a first edge area 9a surrounding the first contact surface 5a and a second edge area 9b surrounding the second contact surface 9b. According to what has been described above, the contact surfaces 5a, 5b are worn down during the life of the brake member, so that they are flat and exhibit a surface normal ez. The edge area is defined as the area where the contact surfaces 5a, 5b are connected to side surfaces 10-15. Accordingly, the side surfaces exhibit surface normals es extending in different directions from the surface normal ez of the contact surfaces (see FIGS. 5 and 6). In a preferred embodiment, the side surfaces include a front and a rear flank 11, 12 that are beveled. The flanks are introduced in order to compensate for the edge effects that arise during the force transfer from the braking cylinders to the backing plate. According to what has been described above, the invention can be utilized both with brake linings designed without flanks, as well as with brake linings designed with flanks. According to traditional designs, the front and rear flanks usually are designed with a surface normal which is inclined approximately fifteen degrees in relation to the surface normal ez of the contact surface. In the embodiment where a front and rear flank are arranged on the brake lining 3, said side surfaces include a first set of side surfaces 10, 13 extending between said front and rear flanks 11, 12. Whenever applicable, said side surfaces further include a second set of side surfaces 14, 15 between which the groove 6 extends.

Figure 4:
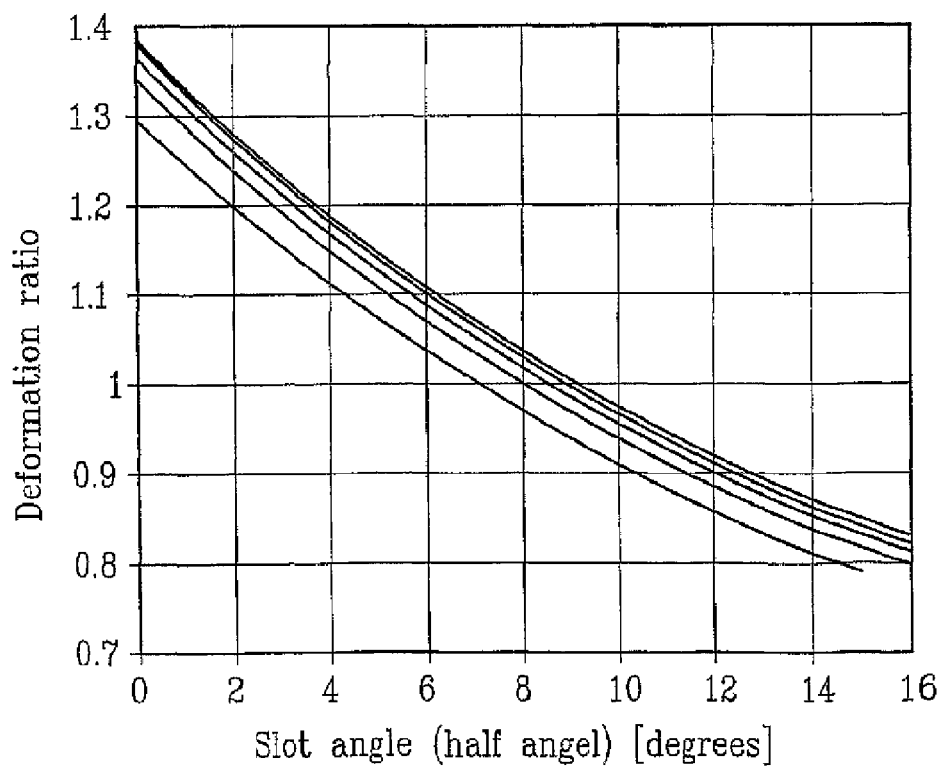
FIG. 4 is a graphical representation of deformation ratio as a function of the inclination of a side surface.

FIG. 4 shows a diagram of deformation ratio as a function of the inclination of a side surface. It is assumed that areas having the same local deformation stiffness will have the same contact pressure when the brake lining is subjected to different loads. The diagram shows calculations, for somewhat different materials, of the deformation ratio between a central point located on the brake lining and a point located on the edge of the contact surface. If the deformation ratio exceeds 1, this means that the edge has a local deformation stiffness which is smaller than in the central area, i.e., the edge is softer than a central area. Conversely, if the deformation ratio is smaller than 1, this means that the edge has a larger local deformation stiffness than the central area, i.e., the edge is harder than a central area. Furthermore, in case the deformation ratio is equal to 1, it is evident that the local deformation stiffness is the same in the edge area as in the central area. According to what has been described above in the part relating to theoretical background, areas having the same local deformation stiffness will have the same contact pressure when the brake lining is subjected to different loads. Thus, the brake member should be designed such that the local stiffness is the same across the entire contact surface of a brake lining. Accordingly, the diagram shows how the deformation ratio varies with the inclination of a side surface in relation to the contact surface. The calculation has been performed for flat side surfaces having a surface normal $e_s$ which forms an angle between 74° and 90° with the surface normal $e_z$ of the contact surface. This means that the side surface forms a flat surface which is slightly beveled in the portion of the side surface facing the contact surface.

The diagram further shows preferred embodiments of the invention where the brake lining exhibits side surfaces that exhibit an angle between 78 and 86 degrees in relation to the contact surface when the deformation ratio differs by less than approximately fifteen percent (15%). A further preferred embodiment of the invention is represented in which the brake lining exhibits side surfaces having an angle between 80 and 84 degrees in relation to the contact surface when the deformation ratio differs by less than approximately ten percent (10%). Still another preferred embodiment of the invention is demonstrated where the brake lining exhibits side surfaces which exhibit an angle between 81 and 83 degrees in relation to the contact surface when the deformation ratio differs by less than approximately five percent (5%).

Figure 5:
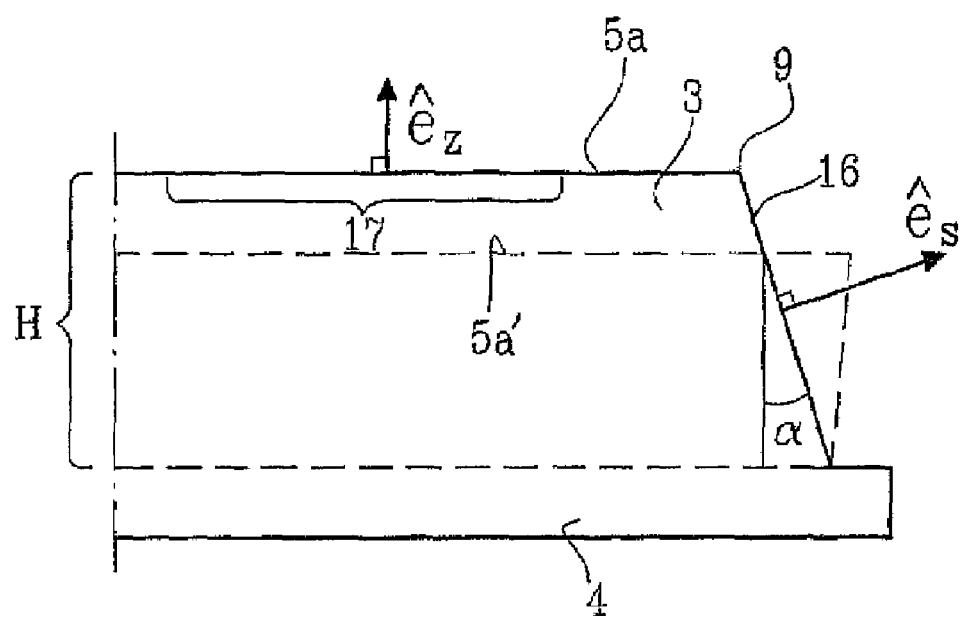
FIG. 5 is a cross-sectional view of a brake member configured according to the present invention.

FIG. 5 shows a cross-section of a brake member 1 according to the invention. The brake member 1 exhibits a brake lining 3 and a backing plate 4. The brake lining 3 exhibits a contact surface 5a having a surface normal ez. Furthermore, the brake lining exhibits a side surface 16, which preferably is chosen optionally from said first and second set of side surfaces 10, 13-15. The side surface 16 exhibits a surface normal es. The surface normal of the side surface and the surface normal of the contact surface form an angle of (90-alpha) degrees with each other when the brake member is in an unloaded condition. The side surface 16 and the contact surface 5a are connected in an edge area 9. Furthermore, FIG. 5 shows the brake member in a condition when subjected to a heavy load, indicated with dashed lines, wherein it can be noticed that the entire contact surface 5a has been subjected to a parallel displacement into a new position 5a'. A parallel displacement under constant pressure across the surface is achieved by means of giving the edge area the same local deformation stiffness as a central area 17 in the interior of the contact surface. The central area 17 in the interior of the contact surface can be defined as all points on the contact surface which are at a distance from an edge 9 which exceeds the thickness H, preferably three times the thickness of the brake lining 3, as measured in the direction of the surface normal ez of the contact surface.

A brake member according to the present invention is achieved when configured to have side surfaces designed in an inclined manner and with a limited variation of local deformation stiffness between edge and interior of the contact surface 5a of the brake lining 3. In the example shown in FIG. 5, the side surface 16 is designed to be flat, which means that the edge will be stiffened to the same degree independent of how much the lining is worn down.

Figure 6:
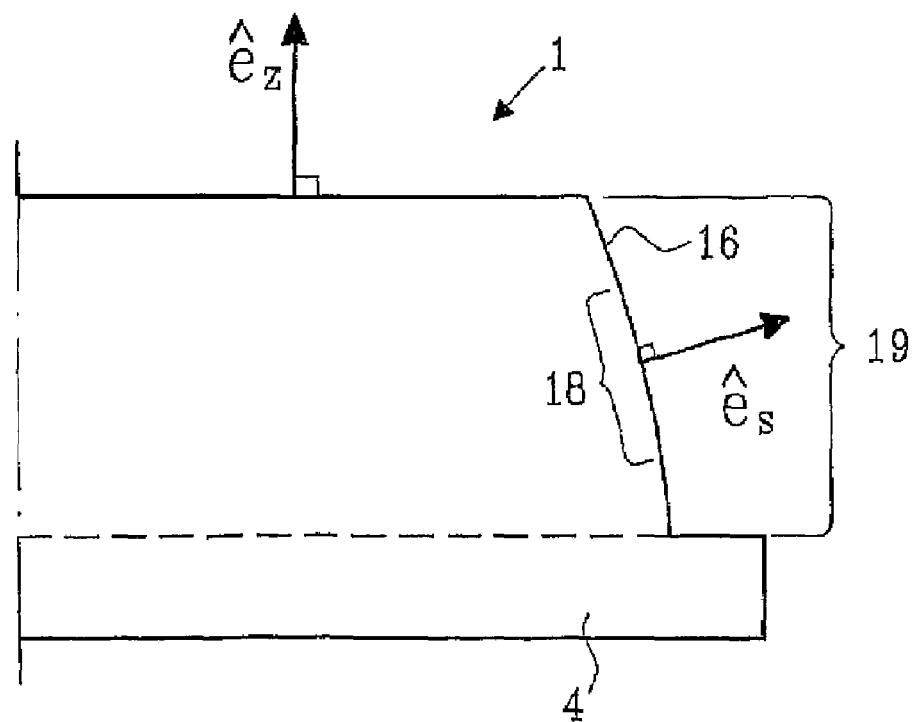
FIG. 6 is a cross-sectional view of an alternative embodiment of a brake member configured according to the invention.

FIG. 6 shows the invention according to another embodiment, where the surface normal es of the side surface 16 varies with the distance from the backing plate 4. This embodiment can be utilized when the influence of the backing plate 4 on the local deformation stiffness of the brake member 1 makes a separate compensation by means of the edge design necessary in order to obtain an edge area having a small deviation in deformation stiffness depending on the thickness and thereby the wear of the brake lining. In this case, according to a preferred embodiment of the invention, the side surface 16 is designed with an arbitrary surface normal es within the main portion 18 of a wear area 19 within the side surface 16, which surface normal es makes an angle between 78 and 86 degrees with an arbitrary surface normal ez within the main portion of the contact surface when the brake member is in an unloaded condition. In the present context, "main portion" should be understood to mean a predominant portion of at least fifty percent or more of the total article, area or portion so described. The wear area is defined as the portion of the side surface that is intended to be worn down during the working life of the brake member 1. The main portion 18 of the wear area can be constituted by the entire thickness of the brake lining or a local part of this, however, preferably at least 50% of the thickness of the brake lining when the brake lining is in an original condition. Preferably, the side surface is designed with a surface normal es which makes a larger angle with the surface normal ez of the contact surface at portions of the side surface which are located close to the backing plate 4 than at portions which are located close to the contact surface 5a.

The brake lining and the backing plate are made of materials that are well known to the skilled person.

The invention also relates to a method for manufacturing a brake member including a backing plate carrying a brake lining which exhibits at least one contact surface and also side surfaces surrounding the at least one contact surface. The side surfaces are connected partly to the contact surface and partly to the backing plate, wherein the contact surface is designed with an edge area surrounding the contact surface, wherein at least a portion of the edge area exhibits a local deformation stiffness in a direction vertical to a plane through the contact surface which differs fifteen percent (15%) at most from the deformation stiffness in a central area in the interior of the contact surface.

In a preferred embodiment of the method, a local deformation stiffness differing ten percent (10%) at most is obtained.

In a further preferred embodiment of the method, a local deformation stiffness that differs 5% at most is obtained.

In a preferred embodiment of the method of the invention, the surfaces are designed for allowing the edge area to exhibit the deformation stiffness. In a further preferred embodiment of the method, the side surfaces are designed with an arbitrary surface normal within the main portion of a wear area within the second set of side surfaces which makes an angle to an arbitrary surface normal within the main portion of the contact surface which is between 78-86 degrees, preferably between 80-84 degrees, and even more preferably 81-83 degrees when the brake member is in an unloaded condition.

According to the invention, a method where the brake member is formed from a material having a varying deformation stiffness, and the variation is arranged to allow a portion of the edge area to exhibit a local deformation stiffness in a direction vertical to a plane through the contact surface which differs fifteen percent (15%) at most from the deformation stiffness in a central area in the interior of the contact surface, can also be utilized. In a preferred embodiment, the deformation stiffness differs ten percent (10%) at most, and preferably five percent (5%).

The invention can be utilized for different types of disc and drum brakes which are well known to the skilled person.

What is claimed is:

1. A brake member comprising:
a backing plate carrying a brake lining, said brake lining having at least one contact surface and side surfaces surrounding said at least one contact surface, said side surfaces being connected between said contact surface and said backing plate; and
said contact surface having a surrounding edge area and at least a portion of said surrounding edge area exhibiting a local deformation stiffness in a direction vertical to a plane through the contact surface which differs fifteen percent at most from the deformation stiffness in a central area of an interior portion of the contact surface, said at least a portion of said surrounding edge area being adjacent to one of said side surfaces and surface normals extending from said surrounding edge area and said one of said side surfaces having an included angle therebetween of between 78° and 86° when the brake member is in an unloaded condition.

2. A brake member as recited in claim 1, further comprising: said side surfaces along said portion of said surrounding edge area having a local deformation stiffness in a direction vertical to a plane through said contact surface differing at most fifteen percent from the deformation stiffness in said central area in said interior of said contact surface.

3. A brake member as recited in claim 1, wherein the local deformation stiffness differs ten percent at most.

4. A brake member as recited in claim 1, wherein the local deformation stiffness differs five percent at most.

5. A brake member as recited in claim 1, wherein the brake lining includes at least two contact surfaces separated by a groove and said portion of said edge area includes a main portion of the edge area of the contact surfaces along said groove.

6. A brake member as recited in claim 5, wherein said groove extends between a second set of side surfaces and a surface normal within the main portion of a wear area within said second set of side surfaces makes an angle between 78 and 86 degrees with an arbitrary surface normal within the main portion of the contact surface when the brake member is in an unloaded condition thereby establishing said edge area's exhibition of a local deformation stiffness in a direction vertical to a plane through the contact surface which differs fifteen percent at most from the deformation stiffness in a central area of an interior portion of the contact surface.

7. A brake member as recited in claim 6, wherein said angle measures between 80 and 84 degrees.

8. A brake member as recited in claim 6, wherein said angle measures between 81 and 83 degrees.

9. A brake member as recited in claim 6, wherein said second set of side surfaces within the main portion of a wear area within said second set of side surfaces are substantially flat.

10. A brake member as recited in claim 1, wherein said included angle measures between 80 and 84 degrees.

11. A brake member as recited in claim 1, wherein said included angle measures between 81 and 83 degrees.

12. A brake member as recited in claim 1, wherein said brake member is adapted to be utilized in a disc brake arrangement.

13. A brake member as recited in claim 1, wherein said brake member is adapted to be utilized in a drum brake arrangement.

14. A squeal retarding brake assembly comprising:
a backing plate carrying a brake lining, said brake lining having a contact surface and side surfaces surrounding said contact surface, said side surfaces being angularly disposed between said contact surface and said backing plate; and
said brake lining comprising a brake-squeal retardation means for preventing squeal noise when said brake assembly is actuated to slow an incorporating vehicle and for assuring that the local stiffness against deformation is substantially uniform across said contact surface during periods of brake actuation thereby preventing squeal noise inducing vibrations in said brake assembly, said brake squeal retardation means comprising the angular disposition of at least one of said side surfaces relative to said contact surface such that surface normals extending from said at least one of said side surfaces and said contact surface have an included angle therebetween of between 78° and 86° when the brake member is in an unloaded condition.

15. The squeal retarding brake assembly as recited in claim 14, wherein said brake-squeal retardation means further comprises configuration of said brake lining so that local deformation stiffness of said contact surface in a direction perpendicular to a plane through said contact surface is substantially constant.

16. The squeal retarding brake assembly as recited in claim 15, wherein said substantially uniform local stiffness of said contact surface against deformation is directly attributable to angular disposition of said side surfaces relative to said contact surface.

17. The squeal retarding brake assembly as recited in claim 16, wherein said brake-squeal retardation means further comprises configuration of said contact surface to include a central area surrounded by a surrounding edge area having a local deformation stiffness approximately fifteen percent different than that of said central area of said contact surface.

18. The squeal retarding brake assembly as recited in claim 16, wherein said brake squeal retardation means further comprises configuration of said contact surface to include a central area surrounded by a surrounding edge area having a local deformation stiffness approximately ten percent different than that of said central area of said contact surface.

19. The squeal retarding brake assembly as recited in claim 16, wherein said brake-squeal retardation means further comprises configuration of said contact surface to include a central area surrounded by a surrounding edge area having a local deformation stiffness approximately five percent different than that of said central area of said contact surface.

* * * * *